(12) United States Patent
Seymour (10) Patent No.: US 9,832,429 B2
(45) Date of Patent: Nov. 28, 2017

(54) SHARED VEHICLE CAMERA

(71) Applicant: Continental Automotive Systems, Inc., Auburn Hills, MI (US)

(72) Inventor: Shafer Seymour, Bartlett, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 140 days.

(21) Appl. No.: 14/659,830

(22) Filed: Mar. 17, 2015

(65) Prior Publication Data

US 2016/0277601 A1   Sep. 22, 2016

(51) Int. Cl.
*H04N 7/18* (2006.01)
*B60R 1/00* (2006.01)
*G08G 1/16* (2006.01)

(52) U.S. Cl.
CPC ............. *H04N 7/181* (2013.01); *B60R 1/00* (2013.01); *G08G 1/163* (2013.01); *B60R 2300/50* (2013.01)

(58) Field of Classification Search
CPC ........... H04N 1/00103; H04N 1/00214; H04N 7/181; B60R 1/00; B60R 2300/50; G08G 1/163
See application file for complete search history.

(56) References Cited

U.S. PATENT DOCUMENTS

| 7,778,770 | B2 | 8/2010 | Sakagami et al. |
| 2012/0169834 | A1 | 7/2012 | Grigsby et al. |
| 2014/0341434 | A1 | 11/2014 | Lin et al. |
| 2016/0227097 | A1* | 8/2016 | Tanaka ............... H04N 5/23206 |

FOREIGN PATENT DOCUMENTS

| DE | EP 1647448 A2 * | 4/2006 | ............... B60R 1/00 |
| EP | 1647448 A2 | 4/2006 | |

OTHER PUBLICATIONS

Search Report dated Sep. 30, 2015, from corresponding GB Patent Application No. GB1507255.6.

* cited by examiner

*Primary Examiner* — Sath V Perungavoor
*Assistant Examiner* — Peet Dhillon (57) ABSTRACT

A camera is attached to a first vehicle and directed away from the first vehicle in order to capture images of object that are near or which approach the first vehicle, including a second vehicle configured to receive and process image data. Data representing images that are captured by the camera of the first vehicle are transmitted to a second vehicle. The image data from the first vehicle is used to provide images of the exterior of the second vehicle from the perspective of the first vehicle.

22 Claims, 6 Drawing Sheets

SHARED VEHICLE CAMERA

BACKGROUND

Exterior cameras are quickly being added to all kinds of vehicles, i.e., trucks and automobiles. Such cameras might eventually be required for automated driving functions such as lane-keeping to fully autonomous control.

Some vehicles are already implementing composite views of the area around the perimeter of the car. While such camera capability can be valuable, it does not provide a view of a vehicle itself. Stated another way, no external-view camera or camera system in the prior art provides a view of a vehicle from a point or location that is away from the vehicle. An apparatus and/or method by which a vehicle can be viewed or seen from the perspective of a person or object that is away from the vehicle would be an improvement over the prior art. A vehicle camera that is directed away from a vehicle, the images or views of which can be provided to or shared with and between other vehicles would be an improvement over the prior art.

DETAILED DESCRIPTION

As used herein, the term, "real time" means the actual time during which something takes place or during which something occurs. A "beacon" is a periodic or continuous signal emitted from a radio transmitter. A "channel" is considered to be a band or range of radio frequencies in which information is carried. It is also considered to be a path or route over which information in the form of an electrical signal passes, including the radio frequency transmitters and receivers that comprise or enable such a path. "Image data" is considered to be data that represents individual picture elements (pixels) that make up an image that is captured by a camera. Image data can represent both individual image frames, i.e., one picture, or series of consecutive image frames from which video is constructed or displayed. The term, "broadcast" refers to the emission of a signal that is available to in-range receivers without limitation. While "transmit" has a meaning that is similar to "broadcast" as used herein a "transmission" is more limited than "broadcast" and refers to sending or conveying in a point-to-point topology with explicitly defined end points.

Figure 1:
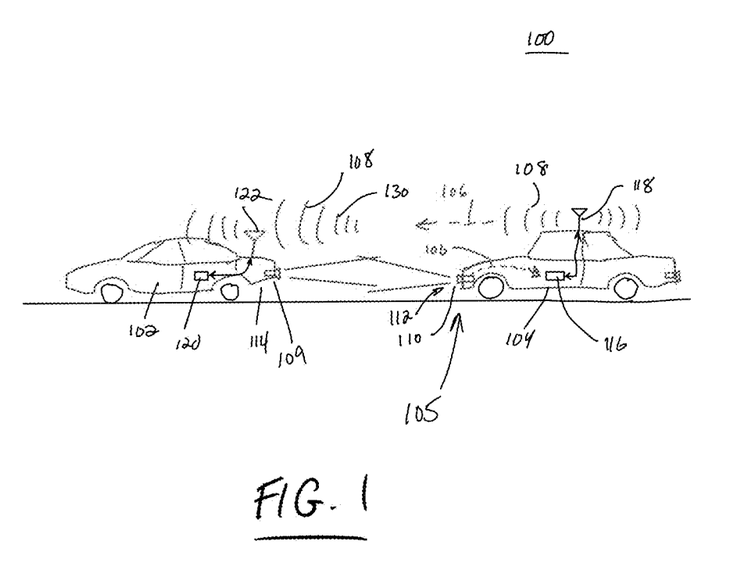
FIG. 1 is a depiction of first and second vehicles, which share image data wirelessly.

FIG. 1 depicts a system 100 for sharing video cameras between vehicles. In the system 100, a first vehicle 102 and a second vehicle 104 share image data 106 in real time through a wireless (radio) connection 108 that is selectively established, as described below, between the two vehicles 102, 104. In FIG. 1, the second vehicle 104 is parked. A camera 110 mounted at the front end 112 of the second vehicle 104 is directed away from the second vehicle 104, i.e., in a direction away from the second vehicles' front end 112 so that the camera 110 can capture images of objects in front of and/or approaching the front end 112 of the second vehicle 104. As shown in FIG. 1, the camera 110 captures images of the rear end 114 of the first vehicle 102. Stated another way, the camera 110 captures images of objects that are behind the first vehicle 102.

Image data 106 output from the camera 110 is provided to a radio frequency transceiver 116, which is coupled to an antenna 118. The image data 106 is transmitted from the second vehicle 104 to a second antenna 122 attached to the first vehicle 102. The second antenna 122 is coupled to mating transceiver 120 in the first vehicle 102. A radio frequency link 130 is thus established between the vehicles 102, 104 over which image data is sent in real time from the second vehicle 104, which is parked, to the first vehicle 102. The parked second vehicle 104 thus provides a camera 110 by which a driver of the first vehicle 102 can "see" the rear end 114 of his own vehicle 102 from the perspective of the second vehicle 104. A person of ordinary skill in the art will appreciate that when the second vehicle 104 is moving and the first vehicle 102 is stationary, an image of the front end 105 of the second vehicle 104 could be provided to the second vehicle 104 by a camera 109 located at the rear 114 of the first vehicle 102.

Figure 2:
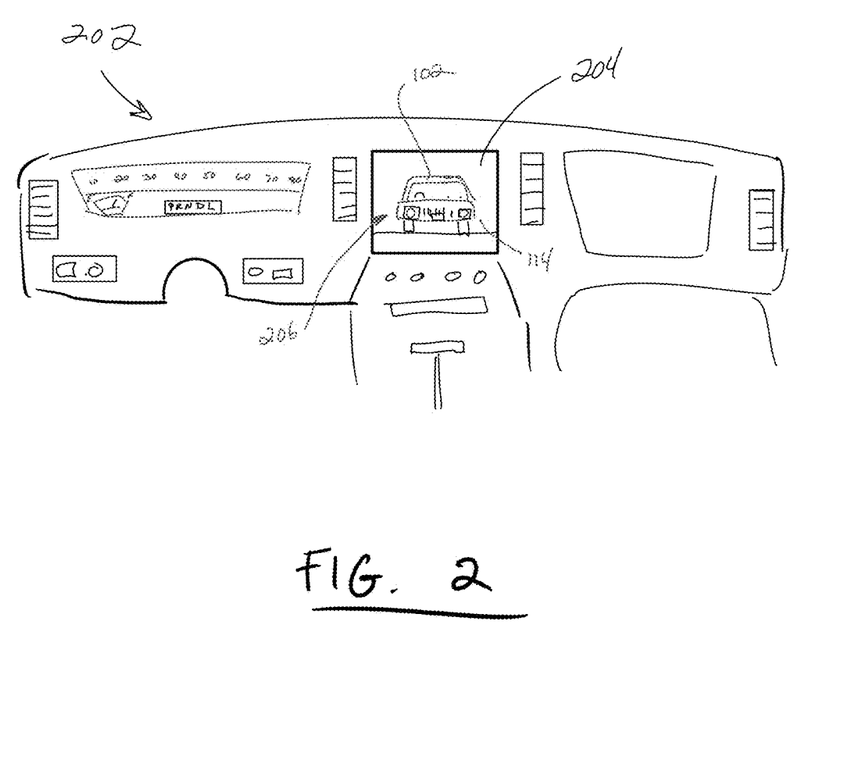
FIG. 2 shows the display of image data obtained by a camera attached to the second vehicle of FIG. 1, which data is wirelessly sent to and actually displayed on a display device in the first vehicle of FIG. 1.

FIG. 2 depicts the dashboard or instrument panel 200 of the first vehicle 102 shown in FIG. 1. In addition to the usual and customary instrumentation and controls 202, the instrument panel 20 is provided a conventional display panel 204, but preferably a touch-sensitive panel, which can also receive inputs and on which images are displayed. An image 206 of the rear end 114 of the first vehicle 102, as "seen" by the camera 110 in the second vehicle 104, is displayed on the display panel 204 of the first vehicle 102. The vehicle camera 110 of the second vehicle 104 is thus "shared" by the first vehicle 102 enabling the driver of the second vehicle 102 to "see" objects in real time that might be behind or beneath the first car 102. The shared vehicle camera also enables the driver of the first car 102 to "see" in real time how near or far the two vehicles 102, 104 are relative to each other and thus avoid a collision between them.

Those who drive vehicles will recognize that images of objects in front of or around vehicles that are far away have little relevance or value to a vehicle being operated. Stated another way, there is little or no value in viewing what is in front of or behind a parked car located more than forty or fifty feet away. An important aspect of the shared vehicle camera concept is therefore the coupling or linking vehicles that are configured to share vehicle camera images, but only when such vehicles are physically close to each other and preferably within ten to twenty feet of each other.

In a preferred embodiment, vehicles configured to share images captured by a vehicle's camera are required to "find" each other using a radio frequency beacon signal that is transmitted by a vehicle having, or which can acquire in real time, image data to send and which is received, in real time, by a second vehicle seeking to receive image data from a vehicle that is nearby the second vehicle. In order to limit the linking to only vehicles that are close to each other, i.e., within a predetermined threshold distance of between about ten up to about twenty feet of each other, the beacon signal is a low-power, low data rate, short-range signal emitted by a transmitter that uses a communications protocol that minimizes current drain when a vehicle is shut off. The beacon signal also includes the geographic coordinates of the vehicle transmitting a beacon signal. Such coordinates are obtained from a conventional global positioning system (GPS) receiver, which is operatively coupled to the radio that generates the beacon. When geographic coordinates of a first, transmitting vehicle are received by a second, receiving vehicle, the separation distance determination is a straight-forward comparison of the receiving vehicle's location, as provided by GPS, to the transmitting vehicle's location, as provided by GPS.

In the preferred embodiment, the beacon signal is a low energy Bluetooth, also known as Bluetooth Smart, advertising signal that includes GPS location information of the vehicle from which the beacon signal is transmitted. It can also be transmitted from a directional antenna, well known to those of ordinary skill in the antenna art, to limit signal coverage area.

Figure 3:
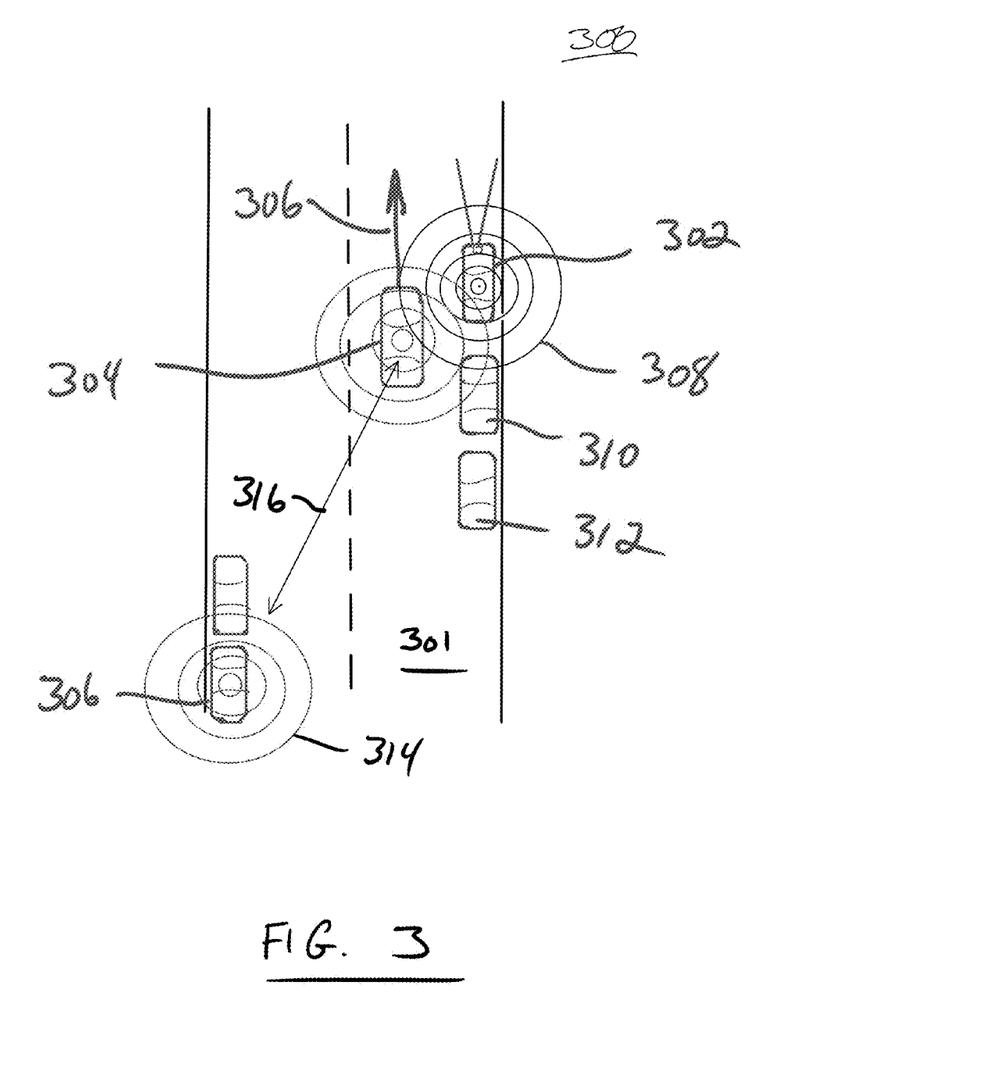
FIG. 3 depicts the propagation of limited range beacon signals transmitted by vehicles configured to share video camera image data.

FIG. 3 is an aerial view 300 of vehicles parked on both sides of a street 301. Two vehicles 302, 306 are parked and configured to broadcast a beacon from omni-directional antennas. The beacon signal indicates the vehicles' ability to share their respective vehicle cameras, not visible in FIG. 3 because it is an aerial view. A first vehicle 304 depicted in FIG. 3 is moving in a direction 306 and located abreast of a second vehicle 302, is parked and transmitting a beacon, a wave front of which is identified by reference numeral 308. Other vehicles 310, 312 located behind parked vehicle 302 are not transmitting a beacon.

A second beacon 314 is broadcast from a vehicle 306 located away from the moving vehicle 304 that is too far away for its beacon 314 to be received. Even if the second beacon signal 314 were to be received by the moving vehicle 304, geographic coordinates broadcast from the farther-away vehicle 306 would enable the moving vehicle 304 to ignore the second beacon 314 as being from a vehicle 306 too far away to provide meaningful image information.

Figure 4:
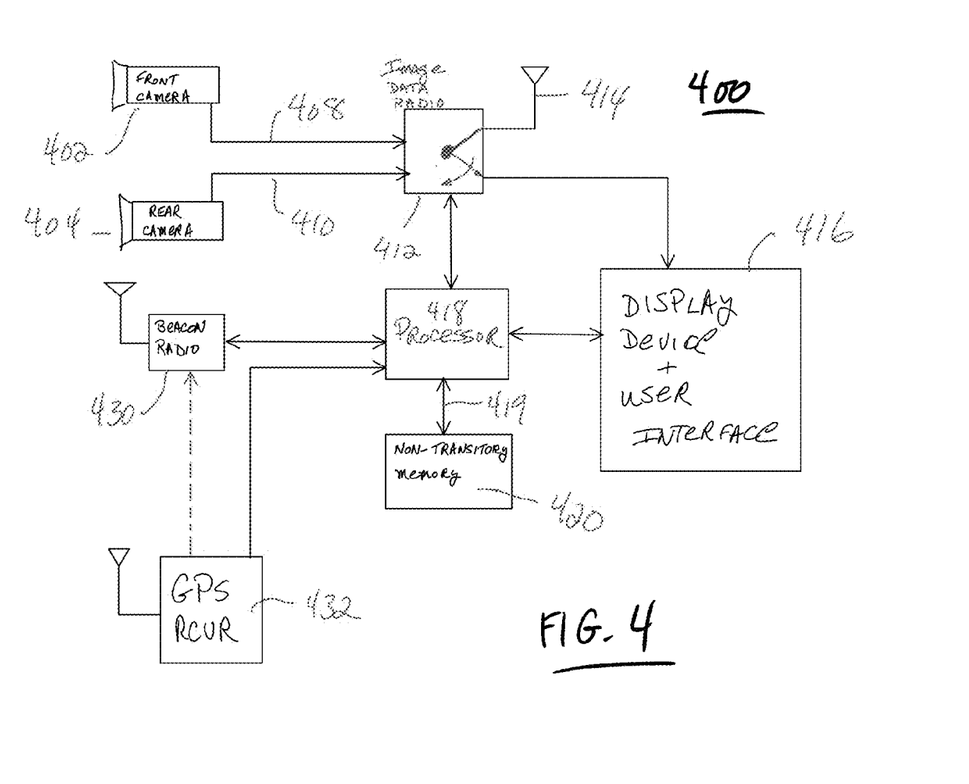
FIG. 4 is a block diagram of an apparatus by which image data obtained by a camera in a second vehicle can be sent to a first vehicle and displayed on a display device in the first vehicle.

FIG. 4 depicts a preferred embodiment of an apparatus 400 for sharing vehicle camera images between vehicles. The apparatus 400 can capture image data and transmit such data. It can also receive image data from a similar apparatus in another vehicle and display images using the image data that was captured by and transmitted from the other vehicle.

A first camera 402 is located at and attached to the front end of a vehicle. It is directed away from the vehicle so that it can capture images of objects in front of the vehicle, including objects that approach the front of the vehicle or which the front of the vehicle approaches.

An optional second camera 404 is located at and attached to the rear end of a vehicle. It too is directed away from the vehicle so that it can capture images of objects but the images that the rear camera 404 captures are of objects that approach the rear of the vehicle or which the rear of the vehicle approaches.

Image data 408 from the front camera 402 and image data 410 from the rear camera 404 is selectively transmitted by the image data radio 412 responsive to control signals that an image data radio 412 receives from a processor 418 that controls the apparatus 400. Instructions for the processor 418 are stored in a non-transitory memory device 420 that is coupled to the processor 418 via a bus 419. Those instructions cause the processor 418 to direct the image data radio 412 to transmit either the image data 408 from the front camera 402 or image data 410 from the rear camera 404.

Unlike the low data rate radio 430 that transmits the low-power, short-range beacon signal, the image data radio 412 is a high data rate radio transceiver capable of transmitting image data 408, 410 from the cameras 402, 404 in real time. A radio transceiver compliant with one or more of the IEEE 802.11 protocols, is one example of a high data rate transceiver.

Inasmuch as the image data radio 412 is a transceiver, the image data radio 412 is also capable of receiving image data from its associated antenna 414, and which is received from another vehicle that is also configured to share vehicle camera images and data, and providing received image data directly to a display device 416 located on the instrument panel of a vehicle. In an alternate embodiment, image data received from the antenna 414 is routed through a processor 418 where it can be processed to improve or alter images and then provided to the display device 416.

The beacon radio 430 is preferably a low energy Bluetooth radio that operates under the control of the processor 418. The beacon radio 430 transmits either continuously or periodically and in so doing, broadcasts its location coordinates as provided to it by GPS receiver 432. The function of the beacon signal is to announce or "advertise" image-sharing capabilities of the vehicle from which the beacon signal is transmitted.

In another embodiment, the beacon radio 430 broadcasts the "identity" of the vehicle from which the beacon signal is sent. As used herein, the "identity" of a vehicle can be a manufacturer's vehicle identification number (VIN), a state license plate, the make, model, year and color of the vehicle, all of which enable a particular vehicle to be distinguished from nearby vehicles and stored in the non-transitory memory 420.

Figure 5:
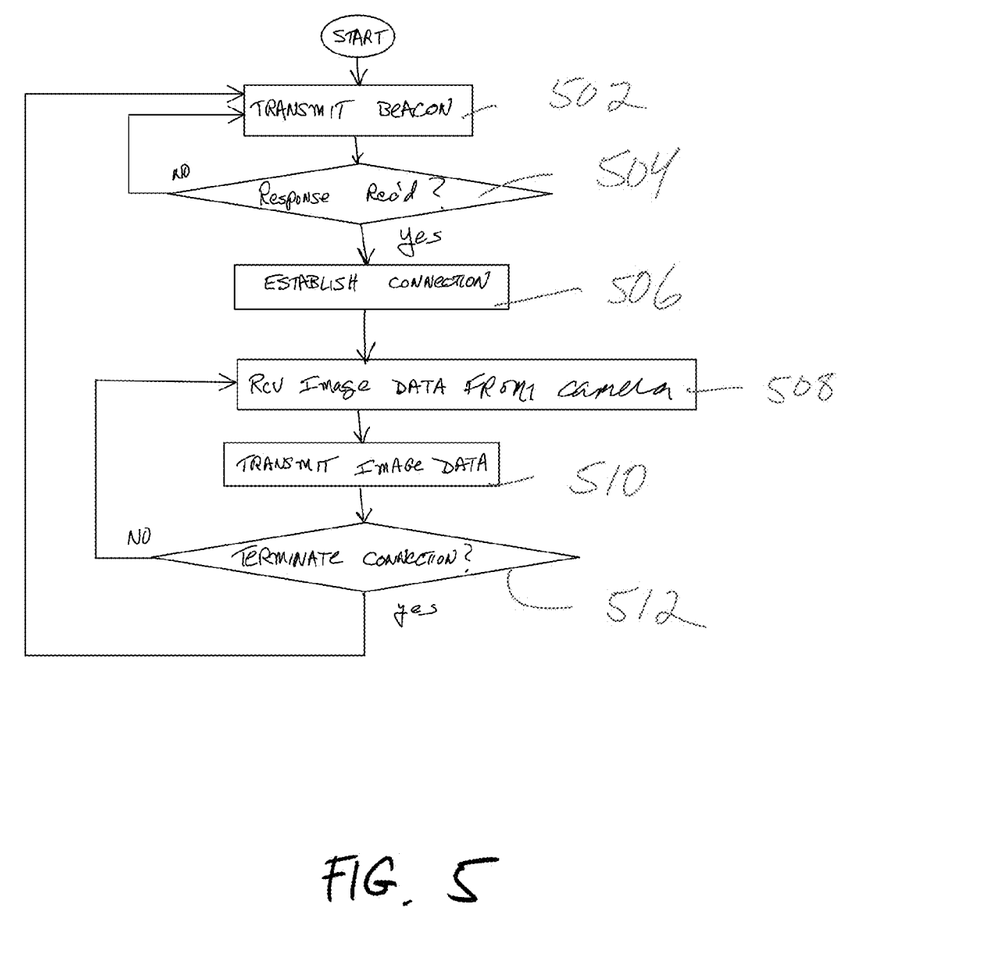
FIG. 5 depicts steps of a method by which a parked, second vehicle establishes a wireless connection with a first vehicle and provides image data in real time to the first vehicle that wants image data from the second vehicle.

The method steps performed by a parked vehicle transmitting a beacon signal and the method steps performed by a moving vehicle looking for a beacon signal are similar. In the preferred embodiment, and as shown in FIG. 5, a parked vehicle offers to make its vehicle camera images available by first transmitting a beacon signal at step 502. The beacon signal simply announces the presence of a vehicle in a limited or small area, which is able to share images that cameras attached to the vehicle capture.

As used herein, the term "handshake" refers to an interlocked exchange of signals between two radios or two computers. One is usually considered a "master;" the other is usually referred to as a "slave." A "handshake" controls the transfer of data.

At a first step 502 performed after a vehicle is parked, the beacon signal is broadcast. In one embodiment, the beacon signal is broadcast from a directional antenna or a phased array of antennas. As described above, the beacon signal preferably includes geographic coordinates (latitude and longitude) and information that uniquely identifies the vehicle. The beacon is preferably transmitted until a response is received, such as a communications protocol handshake used with Bluetooth and WI-FI, the completion of which is illustrated in FIG. 5 at step 504.

A successful reception of the beacon data by a second vehicle at step 504 leads directly to the establishment of a communications link between the two vehicles' image data radios, depicted as step 506. Such a communications link essentially couples two of the apparatus shown in FIG. 4, i.e., a first apparatus 400 in a first vehicle and a second apparatus 400 in a second vehicle. The beacon-response handshake thus enables the sharing of vehicle camera image data, after the beacon radio handshake.

As described above and as shown in steps 508, 510 captured image data that is output from a vehicle camera is transmitted in real time to an image data radio. The same data is transmitted in real time from the vehicle's image data radio until the connection between the two radios is terminated as shown in FIG. 512, as happens when a receiving vehicle is parked and shut off.

Figure 6:
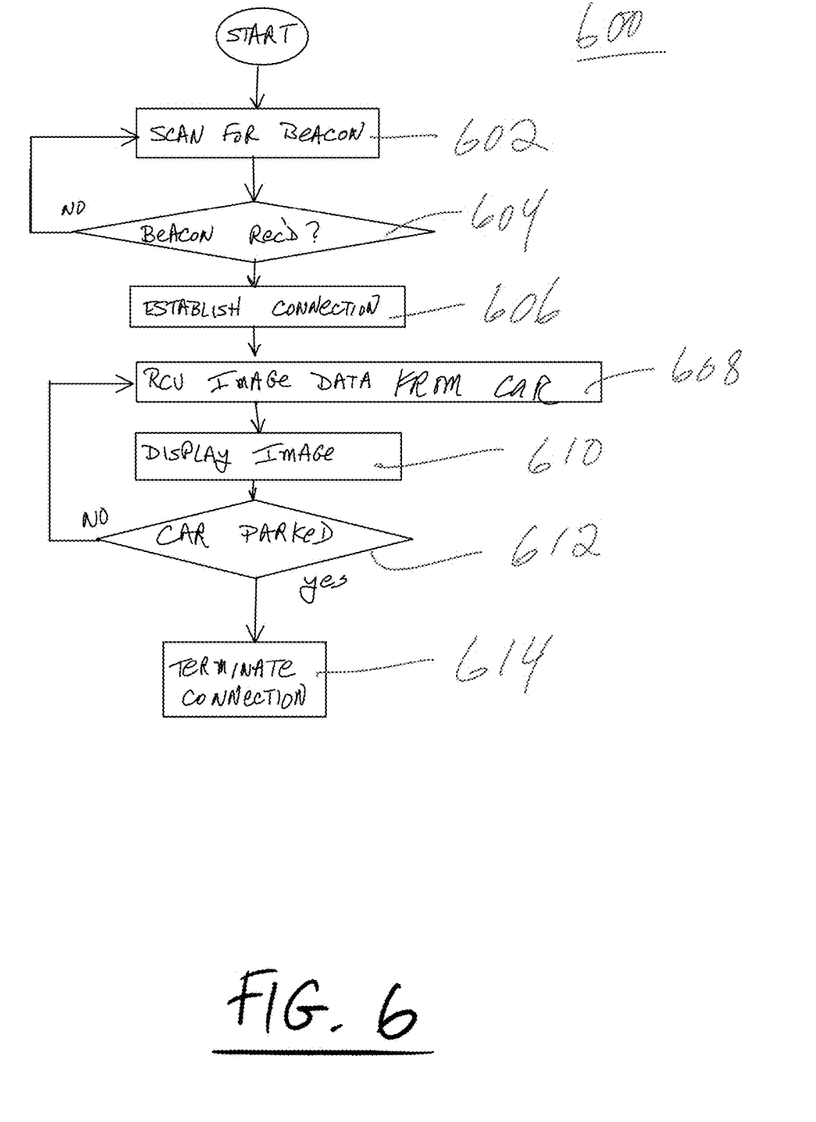
FIG. 6 depicts steps of a method by which a moving, first vehicle searches for a second vehicle that can provide image data to assist parking the first vehicle.

Steps of a method performed by a vehicle seeking to receive shared vehicle camera images are depicted in FIG. 6. As a first step 602, the area around a vehicle is selectively scanned for a signal in the beacon radio frequency band using either an omni-directional or a directional antenna.

When a beacon radio signal is received as shown at step 604, geographic coordinates that are transmitted with the beacon signal and vehicle-identifying information is stripped off such that the beacon-transmitting vehicle can be identified by the receiving vehicle and a decision made whether to receive and/or display images captured by the other vehicle.

In steps 606-610, the image data radios in two vehicles are wirelessly linked or coupled to each other. Image data received via the wireless link is provided in real time to a display device. The reception and presentation of images within the receiving vehicle typically continues until the vehicle is parked and/or shut off but other events or criteria can terminate the connection 614 such as starting and moving the image-transmitting vehicle away.

In the embodiment described above, the beacon radio and image data radio are separate radios that operate in potentially different frequency bands using different modulation schemes, consume different amounts of power and transmit data at different rates. They are also considered to be radio channels. In the preferred embodiment, the beacon radio/ radio channel is selected and configured to minimize battery current drain. In an alternate embodiment, one radio and one modulation scheme can be used to both transmit a beacon and image data yet provide two different data "channels."

The methodology and apparatus described above, which provides a vehicle camera that captures images of objects that can be wirelessly provided to or shared with other vehicles for the benefit of drivers of such other vehicles, is for purposes of illustration only. The true scope of the invention is set forth in the following claims.

What is claimed is:

1. An apparatus for a vehicle, the apparatus comprising:
   a first radio channel coupled to the vehicle, the first radio channel configured to receive a broadcast of a beacon, the beacon advertising that captured image data is available for reception via a second radio channel, the captured image data representing an image of the front end of a first vehicle, the image of the front end of the first vehicle being captured the rear of a second vehicle that is located in front of the first vehicle;
   a second radio channel coupled to the first vehicle, the second radio channel configured to receive the captured image data from the second vehicle; and
   a display device inside the first vehicle and configured to display images in the first vehicle that are represented by the received captured image data obtained from the second vehicle.

2. The apparatus of claim 1, wherein the first radio channel is a low data-rate signaling channel configured to establish a connection via said first radio channel, and wherein the second radio channel is a high data-rate communication channel configured to receive captured image data in real time, after the connection via the first radio channel is established.

3. The apparatus of claim 1, wherein the beacon comprises a signal having information that identifies the location and identity of a vehicle broadcasting the beacon, said vehicle that broadcasts the beacon being capable of sharing captured image data via the second radio channel.

4. The apparatus of claim 1, wherein the beacon provides information identifying image data sharing capabilities.

5. The apparatus of claim 1, further comprising a directional antenna and wherein the beacon is received from the directional antenna from a first predetermined direction.

6. An apparatus for a vehicle having front and back ends, the apparatus comprising:
   a camera attached to the first vehicle and directed away from the back end of the first vehicle toward a front end of a second vehicle, the camera being configured to capture images of the front of the second vehicle and to provide captured image data; and
   a first radio channel configured to broadcast a beacon, which advertises that captured image data is available for transmission from the first vehicle; and
   a second radio channel configured to transmit captured image data to the second vehicle wherein images of the front end of the second vehicle, captured by the first vehicle, are displayed in the second vehicle.

7. The apparatus of claim 6, wherein the first radio channel is a low data-rate signaling channel configured to establish a connection, and wherein the second radio channel is a high data-rate communication channel configured to transmit capture image data in real time.

8. The apparatus of claim 6, wherein the beacon comprises a signal having information that identifies the location of the first vehicle and the identity of the first vehicle.

9. The apparatus of claim 6, wherein the beacon carries information identifying image data sharing capabilities of the vehicle.

10. The apparatus of claim 6, further comprising a directional antenna and wherein the beacon is transmitted from the directional antenna in a first predetermined direction.

11. A method of sharing images captured by a camera attached to a first vehicle and which captures images of objects external to said first vehicle and which are behind the first vehicle, the method comprising:
    transmitting a shared-image-available beacon signal from the first vehicle using a first radio channel;
    selectively transmitting captured image data that represents an image of the front end of a second vehicle that is behind the first vehicle, using a second radio channel responsive to reception of the beacon signal via the first radio channel.

12. The method of claim 11, wherein the step of transmitting a shared-image-available beacon signal additionally comprises transmitting the beacon signal at a low data rate, and wherein the step of selectively transmitting captured image comprises transmitting said captured image data via a high data-rate communications channel.

13. The method of claim 11, wherein the step of selectively transmitting captured image is performed after a wireless connection is established between the first vehicle and a second vehicle via the first radio channel.

14. The method of claim 13, wherein the connection is established when the first vehicle and the second vehicle are separated from each other by a distance that is less than a predetermined threshold.

15. The method of claim 13, wherein the step of transmitting a shared-image-available beacon signal additionally comprises transmitting information that identifies the location of the first vehicle and the identity of the first vehicle.

16. The method of claim 13, wherein the steps of transmitting a shared-image-available beacon signal and selectively transmitting captured image data comprises transmitting said signal and said data using a directional antenna.

17. A method of displaying images in a first vehicle, which are captured by a camera attached to a second vehicle, the camera attached to the second vehicle capturing images of objects behind the second vehicle, the first vehicle being located behind the second vehicle, the method comprising:
receiving at the first vehicle, a shared-image-available beacon signal using a first radio channel;
selectively receiving at the first vehicle, captured image data using a second radio channel, the captured image data representing an image of the front end of the first vehicle, after reception of the shared-image-available beacon signal via the first radio channel.

18. The method of claim 17, wherein the step of receiving a shared-image-available beacon signal additionally comprises receiving the beacon signal at a low data rate, and wherein the step of selectively receiving captured image comprises receiving said captured image data via a high data-rate communications channel.

19. The method of claim 17, wherein the step of selectively receiving captured image is performed after a wireless connection is established between the first vehicle and a second vehicle via the first radio channel.

20. The method of claim 19, wherein the connection is established when the first vehicle and the second vehicle are separated from each other by a distance that is less than a predetermined threshold.

21. The method of claim 19, wherein the step of receiving a shared-image-available beacon signal additionally comprises receiving information that identifies the location of a second vehicle and the identity of the second vehicle.

22. The method of claim 19, wherein the steps of transmitting a shared-image-available beacon signal and selectively transmitting captured image data comprises transmitting said signal and said data using a directional antenna.

* * * * *